United States Patent [19]
Reuben

[11] 4,174,991
[45] Nov. 20, 1979

[54] PROCESS OF LAMINATING CARPET TO ELASTOMERIC BACKING

[75] Inventor: Harold Reuben, Akron, Ohio

[73] Assignee: The Akro Corporation, Canton, Ohio

[21] Appl. No.: 959,727

[22] Filed: Nov. 13, 1978

[51] Int. Cl.² ............................................. B29C 19/00
[52] U.S. Cl. ..................... 156/242; 156/282
[58] Field of Search .................. 156/72, 242, 282, 285

[56] References Cited

U.S. PATENT DOCUMENTS

| | | | |
|---|---|---|---|
| 3,150,024 | 9/1964 | Penman | 156/282 |
| 3,673,034 | 6/1972 | Squier | 156/242 |
| 4,016,318 | 4/1977 | DiGioia | 428/95 |

Primary Examiner—Marion E. McCamish

[57] ABSTRACT

A method of laminating a curable elastomeric backing section to a pile carpet section, for example, for automobile floor mats, utilizing a compressive molding process to laminate the curable elastomeric backing to the carpet. Cooling the pile of the carpet protects the carpet from becoming substantially permanently deformed during molding despite the compressive molding pressure. While the carpet pile is being cooled, sufficient heat is applied to the elastomeric backing to cure the backing. The back face of the carpet is bonded to the elastomeric backing during the compressive molding process.

16 Claims, 7 Drawing Figures

PROCESS OF LAMINATING CARPET TO ELASTOMERIC BACKING

BACKGROUND OF THE INVENTION

1. Field of Invention

The present invention relates to the lamination of a pile carpet section to a curable elastomeric backing section by compressive molding. The lamination method is particularly applicable to the manufacture of automobile floor mats.

2. Description of Prior Art

Automobile floor mats have been manufactured by molding a pile carpet layer to a curable elastomeric backing in a two part mold while heating both mold sections to provide the necessary heat to cure the elastomeric backing. In that process the carpet pile became substantially deformed and had to be revived with compressed air to achieve a carpet pile which was commercially acceptable. However, it was discovered that some carpet piles, such as certain nylon-tufted, cut pile carpets, could not be sufficiently revived to achieve a commercially acceptable appearance.

Methods have been utilized to prevent crushing of a pile carpet during various lamination methods. Callahan (U.S. Pat. No. 3,554,824) passes a web of a thermoplastic-backed, tufted carpet under tension about a heated roller to provide pressure on the back face of the carpet to cause the thermoplastic layer to flow about the connecting loops of the pile. Cotterman (U.S. Pat. No. 2,296,502) provides rigid carding pins to prevent crushing of the carpet pile when a vulcanizable backing is molded to the carpet under the force of heated fluid. A shallow mold plate is used in Hankins (U.S. Pat. No. 3,042,564) to prevent compression of the carpet pile during molding. Squier (U.S. Pat. No. 3,673,034) utilizes an extensible blanket to protect the carpet pile during forming.

A thermoplastic material is coated onto the back of a continuous web of carpet in Penman (U.S. Pat. No. 3,150,024) by spreading a layer of thermoplastic powder on the carpet backing and passing the thermoplastic powder under heaters. The surface of the carpet pile is continuously passed over a cooled platen to keep the pile and backing cool in order to prevent the heat applied to the backing from injuring the pile or backing and to prevent any color change in the pile.

Di Gioia (U.S. Pat. No. 4,016,318) discloses a moldable tufted automobile carpet mat having a moldable thermoplastic urethane resin layer and a flexible thermoset urethane resin backing layer. The mat can be heated to a temperature of about 150° to 200° F. to render the thermoplastic resin layer heat moldable by cold molding the mat under pressure.

Copies of the foregoing patents were appended to the original application papers.

SUMMARY OF THE INVENTION

A method of laminating a curable elastomeric backing section, such as a slab or sheet, to a pile carpet section is provided which avoids substantially permanent deformation of the carpet pile when molded under pressure to bond the carpet to the elastomeric backing with sufficient heat to cure the elastomeric backing. The pile carpet is mechanically bonded to the elastomeric backing by applying sufficient pressure to embed or interlock a portion of the back surface of the carpet in the elastomeric backing section while simultaneously applying sufficient heat to the elastomeric backing layer to set the backing. The pile carpet section and the curable elastomeric backing section are laminated by placing the pile carpet section and elastomeric backing section in a mold capable of applying a compressive molding pressure of at least 50 psi and preferably 150 psi to the carpet and elastomeric backing.

That portion of the mold in contact with the curable elastomeric backing section is heated sufficiently during molding to cure the elastomeric backing. Simultaneously, that portion of the mold in contact with the pile of the carpet section is cooled so as to prevent the carpet pile from becoming substantially permanently deformed under the applied molding pressure in order to maintain the resiliency of the carpet pile upon release of the compressive molding pressure.

The simultaneous cooling of the carpet pile and heating of the elastomeric backing while under compressive molding pressure avoids the crushed appearance of the carpet pile in the finished product. The cooling of the carpet pile in the present invention not only avoids the need for reviving the pile such as by compressed air used in the prior art method, but also permits the lamination by thermal curing of an elastomeric backing to carpets which could not be sufficiently revived in the prior art method to achieve a commercially acceptable product.

In the prior art method, the heat distortion temperature of the carpet pile for a given pressure was exceeded during the molding of the carpet to the elastomeric backing. The carpet pile of that prior art method became substantially permanently deformed or compressed under the applied molding pressure and commercially unacceptable. The use of compressed air to revive the carpet pile since the applicable heat distortion temperature was exceeded not only required an additional step in the manufacturing process but also failed to fully restore the carpet pile to its original condition. By cooling the carpet pile during molding to below its heat distortion temperature, as will be explained in more detail below, the carpet pile maintains its resiliency throughout the molding process so that the carpet pile will substantially return to its original condition without the necessity of a revival step.

The laminated product of the present invention may be produced by bonding a heat curable elastomeric backing material, such as a vulcanizable rubber, and a heat deformable pile carpet, such as a nylon-tufted, cut pile carpet with jute backing. The nature of the carpet and elastomeric backing materials together with a more complete description of the process parameters are set forth below.

The laminated product of the present invention has a wide variety of uses but is particularly adapted to be molded with a textured antiskid lower surface. The perimeter of the laminated product is preferably provided with a binding such as vinyl tape. The product of the present invention is particularly adapted for use as a floor mat in automobiles, trucks, mobile homes, and boats as well as other travel and recreational vehicles. Also, such a floor mat finds utility in other fields such as protective floor mats for homes.

BRIEF DESCRIPTION OF DRAWINGS

In the drawings, wherein like numerals are employed to designate like parts throughout.

DESCRIPTION OF PREFERRED EMBODIMENTS

Figure 1:
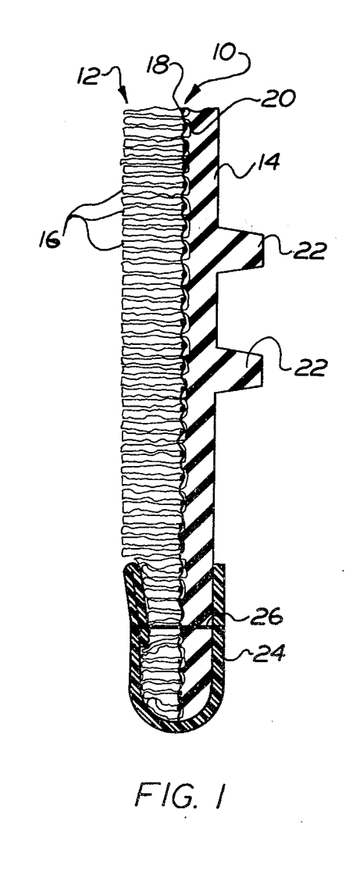
FIG. 1 is a cross section of a portion of an elastomerically backed carpet made in accordance with the present invention, the section line being taken along line 1—1 of FIG. 2.

A cross section of a portion of an elastomerically backed tufted carpet 10 is shown in FIG. 1 having a carpet layer 12 laminated to an elastomeric backing 14. The carpet layer 12 has a plurality of fibers 16 which form the pile of the carpet adjacent the top surface of the carpet layer. The plurality of fibers 16 extend through backing 18 and are interconnected to adjacent fibers through loops 20. Fiber loops 20 are embedded in the elastomeric backing 14 to mechanically lock the carpet layer 12 to the elastomeric backing 14.

The elastomeric backing 14 is provided with a textured antiskid surface formed by a plurality of projections or nubs 22. Projections or nubs 22 are advantageously employed in situations where it is desired to minimize movement between the elastomerically backed carpet 10 and another surface. For example, nubs 22 are preferably employed for automobile mats so that movement between the automobile mats and the automobile floor, frequently carpet, is reduced.

The curable elastomeric backing section has a first surface 31 and a second surface 33 parallel to the first surface 31, the surfaces being the major planar surfaces of the backing. The pile carpet also has a first or back surface 35 and a second surface 37 parallel to the first surface 35, the surfaces being the major planar surfaces of the carpet. The carpet pile is adjacent to the second or top surface of the carpet.

For many applications, it is desirable to trim the elastomerically backed carpet 10 with a binding 24 which is secured to the periphery of carpet 10 by stitches 26.

The heat curable elastomeric material is preshaped into discrete sections, such as sheets or slabs, of the uncured elastomer. This permits molding of separate carpet sections with separate elastomeric backing sections. The elastomeric backing material 14 can be formed from any suitable heat curable elastomeric material. Vulcanizable elastomers which are cured by a sulfur reaction mechanism or a metallic oxide mechanism are suitable for use in the present invention as the curable elastomer backing section. Rubbers are particularly suitable for use as the elastomeric backing material, such as natural rubber, butadiene polymers and copolymers such as styrene-butadiene rubbers and polybutadiene rubbers, isoprene polymers and copolymers, chloroprene rubbers such as neoprene, nitrile rubbers, butyl rubbers, and ethylene-propylene rubbers. Styrene-butadiene rubbers are particularly preferred for use in the present invention.

The heat deformable pile carpet employed in the present invention may be tufted, woven or needle-punched and may be backed or unbacked. The fibers of the carpet pile can be composed of natural or synthetic fibers and may be thermoplastic or thermosetting. Heat deformable carpet piles have a tendency to deform under the application of heat and pressure such that the carpet pile becomes substantially crushed or compacted rendering the carpet pile commercially unacceptable in appearance. This is even true of some thermosetting carpet pile fibers.

Application of both heat and pressure to a carpet pile of a heat deformable carpet results in heat distortion of the pile if the heat distortion temperature for a given pressure is exceeded. The heat distortion temperature for a given pressure varies depending on the applied pressure, the carpet fiber material, the twist of the carpet fibers, and the carpet pile density and thickness. The heat distortion temperature can be determined for specific carpets depending on the applied molding pressure.

The carpet fibers preferably used in the carpet piles employed in the present invention are polyamide fibers such as nylon fibers, particularly nylon 6 and nylon 66, polyester fibers, acrylic fibers and polypropylene fibers. The carpet pile can be a cut pile or a looped pile. A cut pile, nylon-tufted carpet with a jute backing is preferred for use in the present invention and is depicted in FIG. 1.

The proper curing of a particular elastomeric backing material primarily depends on the temperature employed during the molding process and the exposure time to the heat; curing times vary depending on the composition of the elastomeric backing material. One important component in the composition of the elastomer which affects the curing time is the nature and amount of accelerators and super or ultra-accelerators in the elastomeric composition. Examples of some common accelerators are benzothiazolyl disulfide and zinc benzothiazyl sulfide; super or ultra-accelerators frequently employed are tetramethylthiuram disulfide and zinc dimethyldithiocarbamate.

The ultimate shape of the elastomeric backing after molding is also a factor in considering the time required for curing the backing. The thickness of the main body portion of the backing and the thickness and length of any projecting nubs or other textured antiskid pattern can also affect the curing time.

With respect to curing temperatures, most heat curable elastomeric materials can be cured when exposed for a sufficient period of time to a temperature in the range of about 250° F. to about 400° F. (approximately 121° C. to about 204° C.). Most elastomers vulcanized by the sulfur reaction mechanism are cured when exposed to a temperature in the range of about 250° F. to about 360° F. (approximatley 121° C. to about 182° C.). The vulcanization temperatures of styrene-butadiene rubbers are generally in the range of about 300° F. to 350° F., (approximately 149° C. to about 176° C.), such as about 325° F.±10° F. (approximately 163° C.±5° C.)

Given the foregoing considerations, most elastomeric backing materials can be cured in about one to about twenty minutes in the present invention with a large majority of elastomers being curable within about one to about ten minutes. For the styrene-butadiene rubber utilized in the example below a curing time of approximately of 5 minutes has been utilized at a temperature of about 325° F.±10° F. but that time can vary depending on the nature and extent of accelerators and ultraaccelerators employed.

A sufficient compressive molding pressure must be employed in the present invention in order to achieve a bond between the back surface of the carpet and the upper surface of the elastomeric backing material. Sufficient compressive molding pressure is also required to mold the elastomeric material into the recesses in the mold cavity. Thus, for example, sufficient molding pressure must be employed in order to embed the loops of a tufted carpet into the elastomeric backing material and also to insure that the elastomeric backing material is formed into the desired textured antiskid pattern. In view of the foregoing, molding presures in the range of about 50 psi to about 250 psi are suitable for the present invention. (The term "psi" is used throughout the specification and claims as defining pounds per square inch gauge pressure.) For a tufted carpet and the textured antiskid pattern depicted in FIGS. 1 and 3, molding pressures in the range of about 125 psi to about 175 psi, such as about 150 psi,±10 psi, are sufficient to bond the carpet and elastomeric backing.

As explained above, the carpet pile must be maintained below the temperature at which the carpet pile becomes substantially permanently deformed under the applied molding pressure so as to maintain the resiliency of the carpet pile upon release of the molding pressure. Cooling the pile of the carpet below about 150° F. (about 57° C.), preferably below about 75° F. (about 24° C.), is suitable for the preferred carpet piles employed in the present invention. The preferred carpet piles will restore to 75% or more of their original height if cooled to below 150° F. For the cut pile, nylon-tufted carpet with jute backing employed in the example below, a temperature below about 75° F., such as about 60° F.,±5° F., (about 16° C.,±2.5° C.) has been found suitable to maintain the resiliency of the carpet pile upon release of the molding pressure.

The laminating method of the present invention involves the steps of contacting one face of a curable elastomeric backing section to the back face of a pile carpet section, placing the curable elastomeric backing section and carpet section under compressive molding pressure, crushing the carpet pile while the curable elastomeric backing and carpet are under the compressive molding pressure, embedding a portion of the back face of the carpet in the curable elastomeric backing, heating the curable elastomeric backing to set the elastomeric backing simultaneously while the carpet and curable elastomeric backing are under the compressive molding pressure, cooling the pile carpet to maintain the carpet pile below a temperature at which the carpet pile becomes substantially permanently deformed under the applied molding pressure so as to maintain the resiliency of the carpet pile upon release of the molding pressure, and maintaining the heating of the curable elastomeric backing section until the elastomeric backing is set. The cooling is conducted simultaneously while the carpet and elastomeric backing are under pressure. The execution of the manipulative steps of the molding process of the present invention will be apparent from the description below of the molding apparatuses depicted in the drawings.

Figure 4:
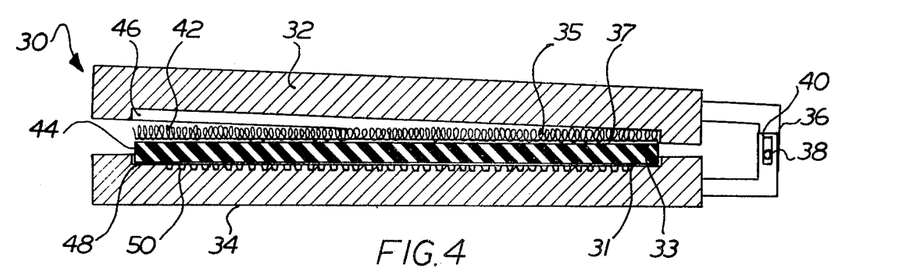
FIG. 4 is a cross section through a hinged mold box used to laminate a heat curable elastomeric backing section to a pile carpet section in accordance with the present invention, the carpet and elastomeric backing being shown prior to lamination.

The elastomerically backed carpet 10 is molded in a mold box 30 shown in FIG. 4. The mold box 30 has an upper mold plate 32 and a lower mold plate 34 which are connected together for pivotal movement about a hinge 36. The hinge 36 is provided with a pin 38 slidably engaged within a slot 40 not only to allow pivotal movement of the upper and lower mold plates 32, 34 but also to allow uniform vertical movement between plates. In this manner, the hinge 36 can accommodate the thickness of the carpet section 42 and the uncured elastomeric backing section 44 when they are initially placed between the upper and lower mold plates as shown in FIG. 4. Accommodating the thickness of the carpet section 42 and backing section 44 when initially placed in the mold permits the application of uniform pressure between the carpet and elastomeric backing sections during (1) compression of the carpet pile, (2) embedment of the carpet in the backing section 44 and (3) flow of the backing section 44 into the interstices 50 of the lower mold plate.

The upper mold plate 32 is provided with an upper mold recess 46 adapted to receive the carpet section 42. Lower mold plate 34 is provided with a lower mold recess 48 adapted to receive the elastomeric backing 44 and also with a plurality of further indentations adapted to form the nubs 22 shown on the backing layer 14 in FIG. 1. It will, of course, be recognized that the terms "upper" and "lower" are used only in a relative sense as the mold plates are depicted in FIG. 4, it being recognized that the mold box 30 may be inverted for a variety of reasons. One reason for inversion of the mold box will be explained in more detail below in connection with FIG. 7.

Figure 5:
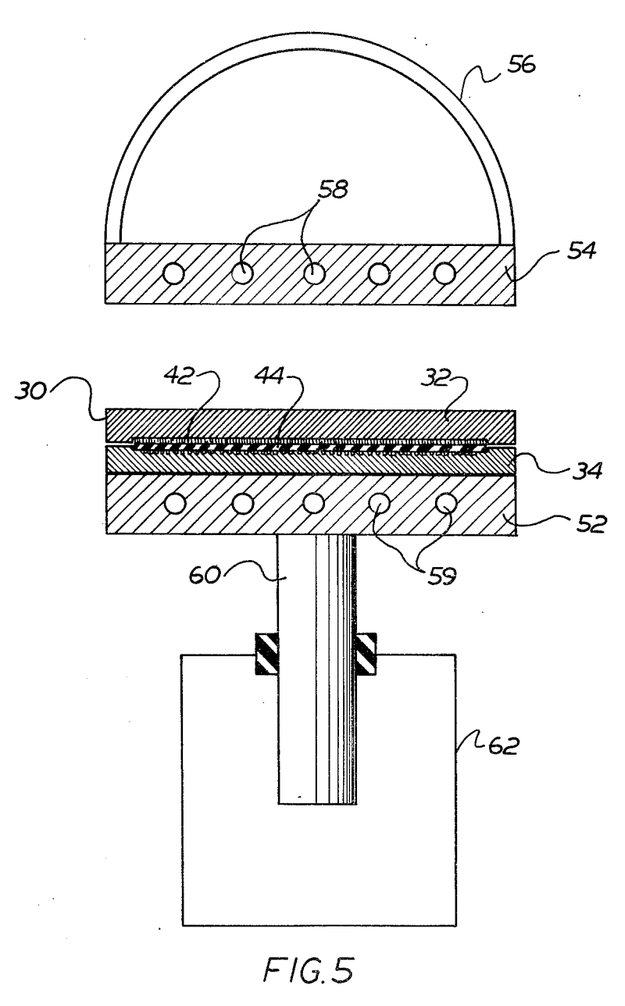
FIG. 5 schematically shows in cross section the mold box shown in FIG. 4 and the molding apparatus used in conjunction therewith.

The mold box 30 is preferably used with a molding apparatus schematically shown in FIG. 5. After the uncured elastomeric backing sheet 44 and the carpet section 42 are placed in the mold box 30, the entire assembly is placed in a molding apparatus such as that shown in FIG. 5 with the upper and lower molding plates 32, 34 adapted for contact with the upper and lower press platens 54, 52. The upper press platen 54 is supported by a bolster 56 and also contains a plurality of temperature control passages 58 for heating or cooling the upper press platen 54. The lower press platen 52 also contains a plurality of temperature control passages 59 for heating or cooling the lower press platen 52. The lower press platen 52 is mounted for movement relative to the upper press platen 54 by any suitable means such as a hydraulic press 62 with a hydraulic ram 60.

After the mold box 30 is placed between the upper and the lower press platens 52, 54 the press platens are moved relative to one another by the hydraulic ram 60 to place the mold plates under compression to bond the carpet and elastomeric backing. The pile of the carpet section is crushed under the compressive molding pressure. When the mold box 30 is under compressive pressure from the two press platens, the mold box 30 is also in thermal contact with the two press platens. In this manner, when the mold box 30 is under compression, the mold plates can be separately regulated to the desired temperatures. The upper mold plate 32 can be cooled by circulating cooling fluid through passages 58 in the upper press platen 54. Simultaneously, the lower mold plate 34 can be heated by circulating heating fluid through passages 59 in the lower press platen 52. Normally, the compressive molding pressure is maintained until the elastomeric backing is fully set, but under some circumstances it may be desirable to release the molding pressure while still maintaining sufficient heating and cooling to set the backing and protect the carpet pile.

Figure 6:
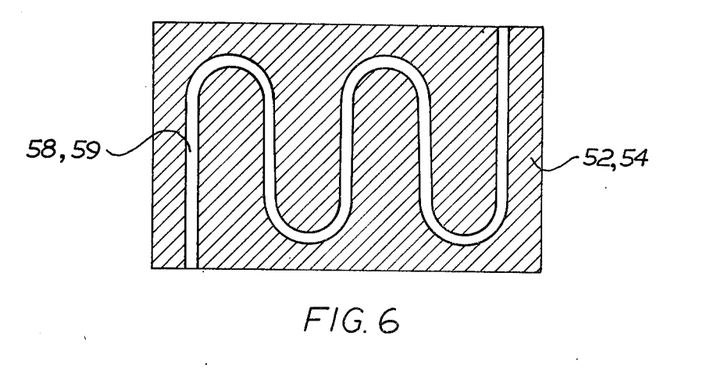
FIG. 6 shows a horizontal cross section through one of the platens of the molding apparatus of FIG. 5 to show the shape of the temperature control passages.

The plurality of heating and cooling passages 58, 59 as shown in the upper and lower press platens 54, 52 are preferably formed in a serpentine shape as shown in FIG. 6 to allow circulation of the heating or cooling fluid through the temperature control passages 58, 59 in the press platens. The temperature control passages 58, 59 could alternatively be formed in the upper and lower mold plates 32, 34.

Any type of fluid for heating and cooling can be circulated through the temperature control passages to achieve the desired temperatures. Ordinary cooling water is preferably employed for cooling the upper mold plate 32 and steam, preferably high pressure steam, is employed for heating the lower mold plate 34.

Figure 7:
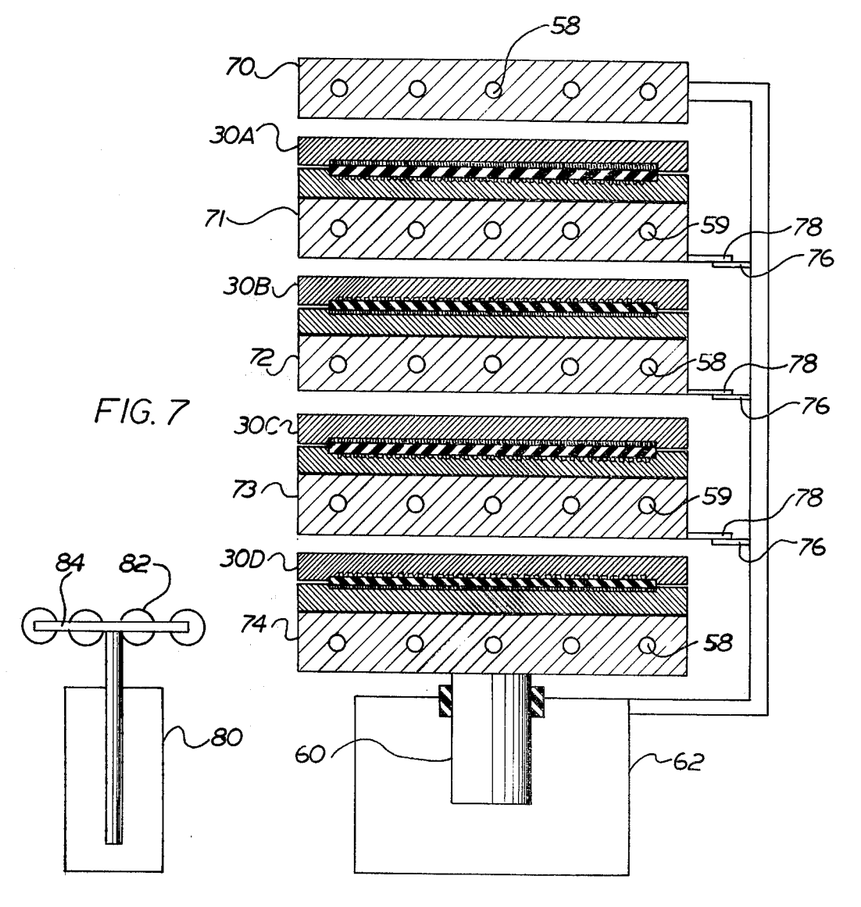
FIG. 7 schematically shows in cross section the molding apparatus for simultaneously laminating multiple sections of elastomerically backed carpet.

A molding apparatus for simultaneously molding a plurality of elastomerically backed carpet products is depicted in FIG. 7. The apparatus depicted in FIG. 7 is similar to that shown in FIG. 5 except for adaptations to permit utilization of multiple mold boxes. A plurality of mold boxes 30A-D are alternately interleaved among a plurality of press platens 70-74. The lowest press platen 74 is mounted for relative movement towards the uppermost press platen 70 by means of the hydraulic ram 60 of the hydraulic press 62. Each of the press platens 70-74 is provided with temperature control passages 58, 59. The molding apparatus of FIG. 7 is illustrated with a plurality of mold boxes 30A-D prior to molding and prior to application of pressure by the hydraulic press 62. Intermediate press platens 71, 72, and 74 are spaced apart by a plurality stops 76 which engage a plurality of projections 78 extending from the press platens to prevent further movement of the intermediate press platens towards the lowermost press platen 74 when the hydraulic ram 60 is lowered.

Each platen is provided with a heat transfer means to separately regulate the temperature of each platen. The uppermost press platen 70 and the lowermost press platen 74 are provided with cooling passages 58 to cool the respective carpet sections of the adjacent mold boxes 30A and 30D. Similarly, the intermediate press platen 72 is provided with cooling passages 58 to cool the carpet sections of the adjacent mold boxes 30B and 30C. The remaining intermediate press platens 71, 73 have heating passages 59 to heat the uncured elastomeric backing layers contained in all of the mold boxes 30A-D. Because of the utilization of the intermediate press platens 71 and 73 to heat all four mold boxes, it will be recognized that mold boxes 30B and 30D will of necessity be "inverted" with respect to the remaining mold boxes 30A and 30C. It will be also recognized that only four mold boxes have been illustrated but that a greater or lesser number of mold boxes could be utilized with the appropriate number of intermediate press platens.

After the carpet and uncured elastomeric backing layers are subjected to molding, the mold boxes and press platens return to the relative positions depicted in FIG. 7. At that point, the mold boxes 30A-D can be removed from between the press platens so that the molded elastomeric backed carpet can be removed and replaced with a carpet layer and uncured elastomeric backing sheet. Lift 80 having a plurality of rollers 82 on a platform 84 can preferably be used to accomplish the unloading and reloading of the mold boxes. In FIG. 7, the platform 84 is positioned adjacent to the lowermost mold box 30D so that the mold box can be transferred onto the rollers 82 and opened to remove the molded product and reloaded with a carpet section and an uncured elastomeric backing sheet. The platform 84 may then be raised to the next level to repeat the same procedure and so on until the entire molding apparatus is ready for the next molding cycle.

EXAMPLE

Figure 2:
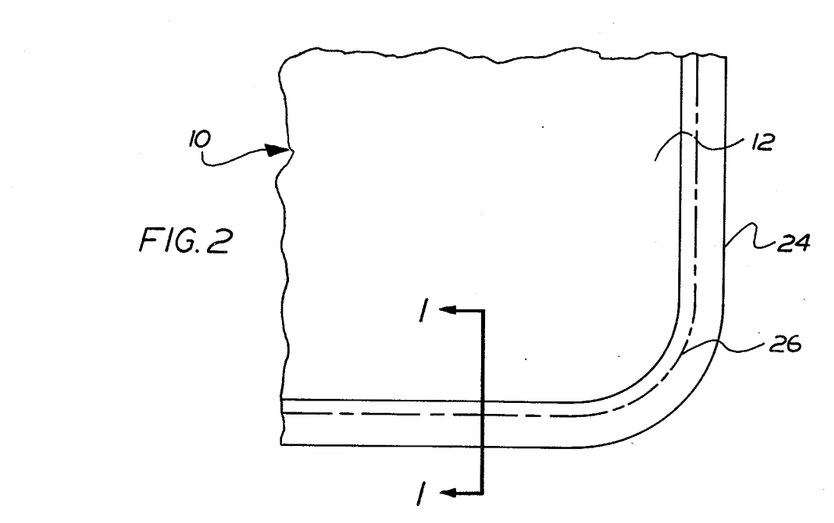
FIG. 2 is a top plan view of the portion of the elastomerically backed carpet shown in cross section in FIG. 1.
Figure 3:
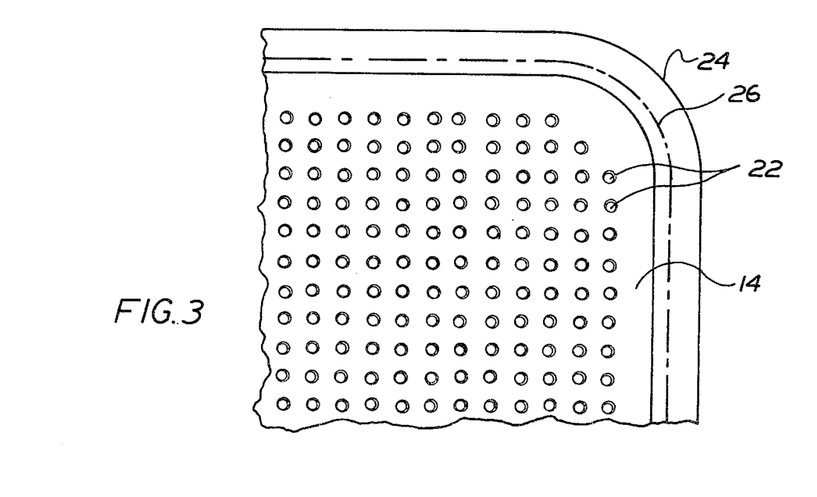
FIG. 3 is a bottom plan view of the portion of the elastomerically backed carpet shown in cross section in FIG. 1.

A generally rectangular automobile floormat was produced by the present invention having the form depicted in FIGS. 1-3. A mold plate to receive the uncured elastomeric backing section was formed to produce nubs of the type shown in FIG. 1 whose centers are longitudinally and laterally spaced 6.3 millimeters from the centers of adjacent nubs. The mold was designed to produce a nub pattern on the entire back side of the automobile mat except within 19 millimeters from the edges of the elastomeric sheet. The numbs were approximately 2.3 millimeters in height with a base of approximately 2.5 millimeters in diameter tapering to a truncated peak of approximately 1.9 millimeters in diameter.

A generally rectangular slab of an uncured styrene-butadiene rubber was placed within a mold of the type illustrated in FIG. 4. The styrene-butadiene rubber had the following composition:

| Components | Number of Parts by Weight | Supplier |
|---|---|---|
| Styrene-butadiene Rubber | 100 | Texas, U.S. - Port Neches Tex. |
| Filler (Clay) | 100 | Huber - Langley, So. Carolina |
| Plasticizer | 5 | Sun Oil - Philadelphia, Pa. |
| Zinc Oxide | 5 | St. Joe Zinc - Josephtown, Pa. |
| Benzothiazolyl disulfide | 3 | R.L. Vanderbilt - Akron, Ohio |
| Tetramethylthiuram disulfide | 1 | R.L. Vanderbilt - Akron, Ohio |

A section of nylon-tufted, cut pile carpet with a jute backing was placed on top of the uncured styrene-butadiene rubber section in the mold. The mold box was then placed within a molding apparatus of the type shown in FIG. 5 and placed under a pressure of approximately 150 psi for about 5 minutes. During molding, the lower platen adjacent to the elastomeric section was heated by circulating high pressure steam at about 325° F. through the serpentine heating passages in the lower platen so as to expose the elastomeric backing to a temperature of about 325° F. In addition, the upper platen adjacent the carpet section was cooled by circulating cooling water of about 60° F. through the serpentine cooling passages in the upper platen so as to maintain the carpet pile at approximately 60° F. After about 5 minutes, the mold box was removed from the molding apparatus, and the bonded laminate was removed from the mold box. A vinyl tape such as that depicted in FIG. 1 was stitched with nylon fishing line to the perimeter of the laminate as a binding.

The carpet pile retained its resiliency during molding because of the cooling and appeared substantially restored to its original condition despite the compressive molding pressure.

What is claimed is:

1. A method of laminating a curable elastomeric backing section having a first surface and a second surface to a heat deformable pile carpet section having a first surface, a second surface, and a carpet pile adjacent to the second surface of the carpet section, comprising:

contacting the second surface of the curable elastomeric backing section to the first surface of the pile carpet section,     placing the curable elastomeric backing section and pile carpet section under a compressive molding pressure of at least 50 psi applied to the first surface of the curable elastomeric backing section and the second surface of the pile carpet section,     crushing the carpet pile while the curable elastomeric backing section and pile carpet section are under the compressive molding pressure,     embedding a portion of the first surface of the pile carpet section in the second surface of the curable elastomeric backing section,     heating the curable elastomeric backing section to set the elastomeric backing simultaneously while the pile carpet section and the curable elastomeric backing section are under the compressive molding pressure,     cooling the pile carpet section to maintain the carpet pile below a temperature at which the carpet pile becomes substantially permanently deformed under the applied molding pressure so as to maintain the resiliency of the carpet pile upon release of the compressive molding pressure, the cooling being conducted simultaneously while the carpet and backing are under pressure, and     maintaining the heating of the curable elastomeric backing section until the elastomeric backing is set.

2. A process as claimed in claim 1 wherein the compressive molding pressure is selected from the range of about 50 psi to about 250 psi, the curable elastomeric backing section is heated to a temperature within the range of about 250° F. to about 400° F., the pile carpet section is cooled to a temperature less than about 100° F., and the heating of the curable elastomeric backing section is maintained for a period of time selected from the range of about one minute to about twenty minutes.

3. A process as claimed in claim 2 wherein the carpet pile is cooled to a temperature less than about 75° F.

4. A process as claimed in claim 1 wherein the curable elastomeric backing section is composed of a heat curable rubber.

5. A process as claimed in claim 1 wherein the elastomeric backing material is a styrene-butadiene rubber and the carpet is a nylon-tufted, cut pile carpet with a jute backing.

6. A process as claimed in claim 5 wherein the nylon-tufted carpet and the styrene-butadiene rubber are subjected to a pressure of about 150 psi±10 psi for approximately 5 minutes while simultaneously heating the styrene-butadiene rubber to a temperature of approximately 325° F.±10° F. and simultaneously cooling the pile of the nylon-tufted carpet to approximately 60° F.±5° F.

7. A process as claimed in claim 1 wherein a plurality of curable elastomeric backing sections are separately molded to a plurality of pile carpet sections during one molding cycle.

8. A method of laminating a curable styrene-butadiene rubber backing section having a first surface and a second surface to a nylon-tufted pile carpet section having a first surface, a second surface, and a nylon fiber carpet pile adjacent to the second surface of the carpet section, comprising:

contacting the second surface of the curable styrene-butadiene rubber backing section to the first surface of the nylon-tufted pile carpet section,     placing the curable styrene-butadiene rubber backing section and nylon-tufted pile carpet section under a compressive molding pressure of about 150 psi±10 psi applied to the first surface of the curable styrene-butadiene rubber backing section and the second surface of the nylon-tufted pile carpet section,     crushing the nylon fiber carpet pile while the curable styrene-butadiene rubber backing section and nylon-tufted pile carpet section are under the compressive molding pressure,     embedding a portion of the first surface of the nylon-tufted pile carpet section in the second surface of the curable styrene-butadiene rubber backing section,     heating the curable styrene-butadiene rubber backing section to a temperature of about 325° F.±10° F. to set the styrene-butadiene rubber backing simultaneously while the nylon-tufted pile carpet section and the curable styrene-butadiene rubber backing section are under the compressive molding pressure,     cooling the nylon-tufted pile carpet section to a temperature of about 60° F.±5° F. to maintain the resiliency of the carpet pile upon release of the compressive molding pressure, the cooling being conducted simultaneously while the carpet and backing are under pressure, and     maintaining the heating of the curable styrene-butadiene rubber backing section for about five minutes.

9. A process of simultaneously laminating a plurality of curable elastomeric backing sections to a plurality of heat deformable pile carpet sections, comprising:

placing one curable elastomeric backing section and one carpet section within each of a plurality of molds so that each elastomeric backing section is in contact with a first portion of each mold and each carpet section is in contact with a second portion of each mold,     interleaving one mold having an elastomeric backing section and a carpet section therein between each pair of a plurality of adjacent platens so that each mold will be inverted relative to the next adjacent mold, said plurality of platens comprising a first platen and a second platen, and at least one intermediate platen located between the first and second platens, each platen having heat transfer means for use in separately regulating the temperature of the platen,     placing each curable elastomeric backing section and carpet section under a compressive molding pressure of at least 50 psi by moving the plurality of platens toward one another,     crushing each carpet pile while each curable elastomeric backing section and pile carpet section are under the compressive molding pressure,     heating the first portion of each mold by transferring heat through the heat transfer means in each platen adjacent to the first portion of each mold to set each elastomeric backing simultaneously while each carpet and curable elastomeric backing section are under pressure, cooling the second portion of each mold by transferring heat through the heat transfer means in each platen adjacent to the second portion of each mold to cool each adjacent carpet pile to maintain the carpet pile below a temperature at which the carpet pile becomes substantially permanently deformed under the applied molding pressure so as to maintain the resiliency of the carpet pile upon release of the compressive molding pressure, the cooling being conducted simultaneously while each carpet and backing section are under pressure, and maintaining the heating of the curable elastomeric backing section until each elastomeric backing section is set.

10. A process as claimed in claim 9 wherein the heating of the first portion of each mold is accomplished by circulating a heating fluid through the heat transfer means in each platen adjacent each first portion of each mold and the cooling of the second portion of each mold is accomplished by circulating a cooling fluid through the heat transfer means in each platen adjacent the second portion of each mold.

11. A process as claimed in claim 9 including providing each intermediate platen with a projection adapted to engage a corresponding stop to limit relative movement among the plurality of platens, moving the plurality of platens away from each other after each heat curable elastomeric backing section is set, and limiting relative movement of the intermediate platens by allowing each projection of each intermediate platen to engage a corresponding stop.

12. A process as claimed in claim 9 wherein the compressive molding pressure is selected from the range of about 50 psi to about 250 psi, the curable elastomeric backing section is heated to a temperature within the range of about 250° F. to about 400° F., the pile carpet section is cooled to a temperature less than about 100° F., and the heating of the curable elastomeric backing section is maintained for a period of time selected from the range of about one minute to about twenty minutes.

13. A process as claimed in claim 12 wherein the carpet pile is cooled to a temperature less than about 75° F.

14. A process as claimed in claim 9 wherein the curable elastomeric backing section is composed of a heat curable rubber.

15. A process as claimed in claim 9 wherein the elastomeric backing material is a styrene-butadiene rubber and the carpet is a nylon-tufted, cut pile carpet with a jute backing.

16. A process as claimed in claim 15 wherein the nylon-tufted carpet and the styrene-butadiene rubber are subjected to a pressure of about 150 psi±10 psi for approximately 5 minutes while simultaneously heating the styrene-butadiene rubber to a temperature of approximately 325° F.±10° F. and simultaneously cooling the pile of the nylon-tufted carpet to approximately 60° F.±5° F.

* * * * *

UNITED STATES PATENT AND TRADEMARK OFFICE
CERTIFICATE OF CORRECTION

PATENT NO. : 4,174,991

DATED : November 20, 1979

INVENTOR(S) : Harold Reuben

It is certified that error appears in the above-identified patent and that said Letters Patent are hereby corrected as shown below:

On the title page add to references cited:

2,296,502,   9/1942,   Cotterman         3,042,564,   7/1962,   Hankins         3,554,824,  10/1966,   Callahan

Signed and Sealed this

Fourteenth Day of July 1981

[SEAL]

*Attest:*

*Attesting Officer*

GERALD J. MOSSINGHOFF

*Commissioner of Patents and Trademarks*